March 24, 1964 A. F. SPINELLI 3,125,817
SNOW-MELTING APPARATUS
Filed Feb. 6, 1961 2 Sheets-Sheet 1

INVENTOR.
A. F. Spinelli
BY Harold E. Cole

ATTORNEY

March 24, 1964  A. F. SPINELLI  3,125,817
SNOW-MELTING APPARATUS
Filed Feb. 6, 1961  2 Sheets-Sheet 2

INVENTOR.
A.F. Spinelli
BY Harold E. Cole
ATTORNEY

United States Patent Office 3,125,817
Patented Mar. 24, 1964

3,125,817
SNOW-MELTING APPARATUS
Anthony F. Spinelli, 21 Sheridan Drive, Milton, Mass.
Filed Feb. 6, 1961, Ser. No. 87,332
2 Claims. (Cl. 37—12)

This invention relates to snow-melting apparatus.

One object of my invention is to provide apparatus that will pick up snow on the ground, throw it to a screen above, and then melt it by spraying streams of hot water upon it.

Another object is to provide such apparatus that also has mechanism that will handle hard objects such as pieces of ice, chunks of snow and the like, deliver them to a receptacle where they are disintegrated and dispose of them in the form of liquid.

Still another object is to provide a tank whereby water resulting from melting the snow can be delivered directly to a heating means and circulated therefrom to conduits from which the hot water is distributed to snow on the screen and in said receptacle.

A further object is to provide means whereby mechanism to pick up and feed the snow is coordinated in its movement with mechanism to receive and carry chunks of snow and ice so that both types of materials are delivered and disposed of simultaneously and continuously.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

Figure 1:
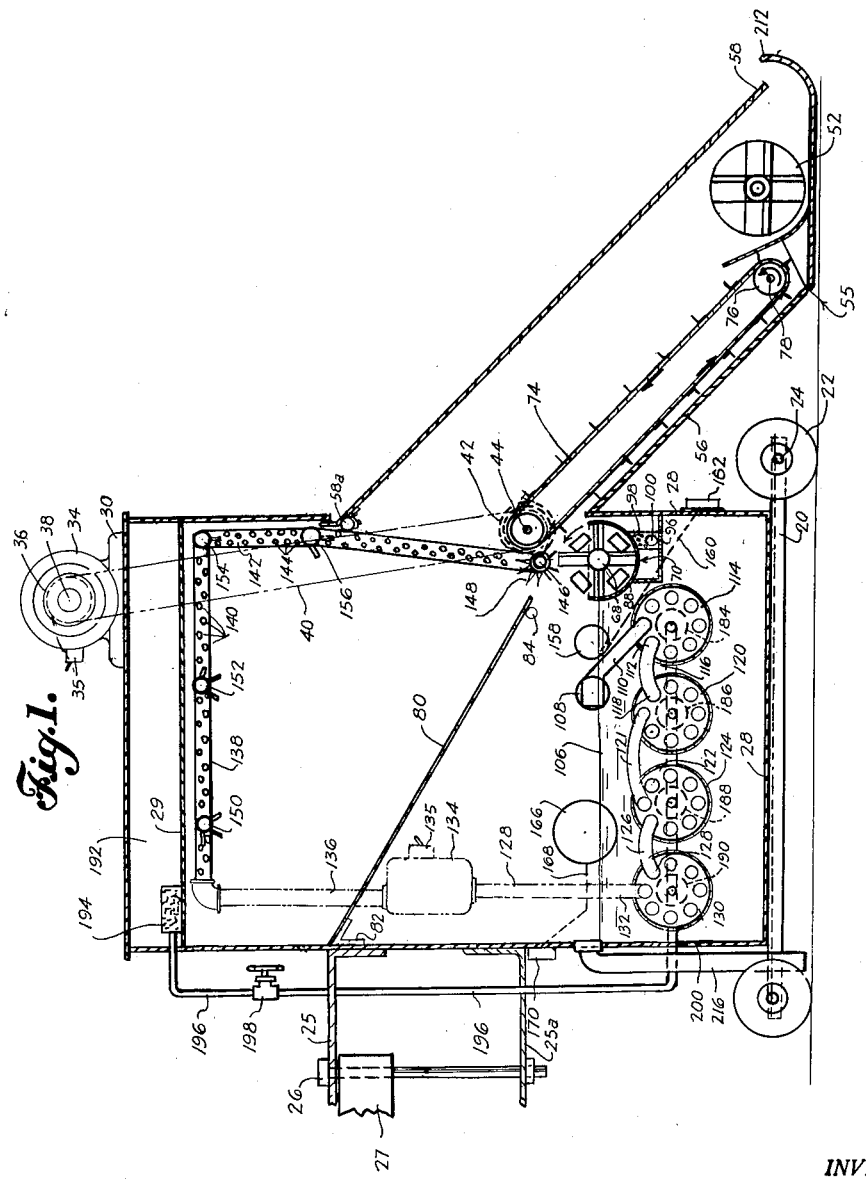
FIG. 1 is a sectional view of my apparatus taken on the line 1—1 of FIG. 2.
Figure 2:
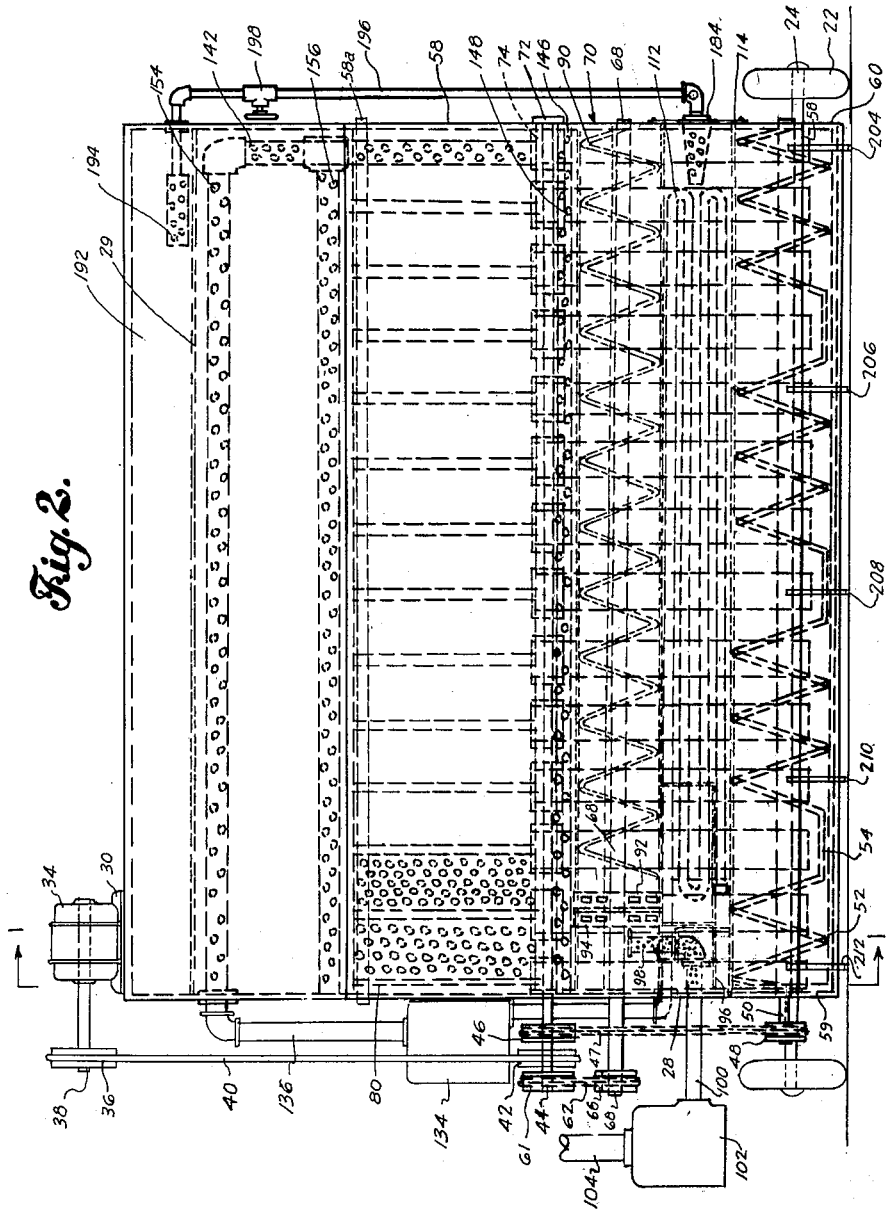
FIG. 2 is a front elevational view of my apparatus.

As illustrated, my apparatus has a main support or chassis 20 having wheels 22 supported by axles 24 rotatably mounted on said chassis. There is an angle attaching member 25 to receive a bolt 26 for attachment to a motor vehicle hitch 27.

My apparatus carries a tank or liquid holding receptacle 28 having a cover 29. A support 30 rests on a fuel tank later described, and it supports a well-known electric motor 34 having a switch 35 which may be powered by a generator carried by a motor vehicle, not shown, that is intended to push my apparatus.

A pulley 36 is rotatably mounted on a shaft 38 of said motor. A belt 40 extends from the latter to a pulley 42 which is mounted on a shaft 44. A sprocket gear 46 is mounted on said shaft 44. A chain belt 47 extends from said sprocket gear 46 to a sprocket gear 48 fixed to a shaft 50 on which is rotatably mounted a rotary sprocket gear 48 fixed to a shaft 50 on which is rotatably mounted a rotary snow feeder 52 which gathers and throws snow by means of its cup feed screw 54. Said snow feeder is part of snow feeding mechanism 55 having a lower chute portion 56 attached to said tank 28 and an upper chute portion 58 hinged to rod 58A which is attached to two side walls 59 and 60.

A sprocket gear 61 is mounted on said shaft 44 from which a chain 62 extends to a sprocket gear 66 mounted on a shaft 68 of a disposal screw device 70 later explained.

Said shaft 44 has a cylinder 72 fixedly mounted around it and a wide conveyor belt 74 runs over said cylinder 72 and over a wide idler pulley 76 mounted on a shaft 78 set in said side walls 59 and 60. Any slush, ice or the like that is not thrown upwardly by said snow feeding mechanism to a screen 80 later described will fall on said conveyor belt 74 and is carried upwardly thereon to said disposal device 70.

A wide screen 80 receives snow thrown onto it from said snow feeding mechanism which screen is attached at one side to said tank by an angle iron 82 and at the other end by a supporting rod 84 mounted at opposite sides of said tank 28.

Said disposal screw device 70 has an outer casing or receptacle 88 in which is set a conveyor screw 90 driven by said shaft 68. At one end of said screw conveyor 90 is a cutter 92 attached to shaft 68. Another cutter 94 is fixedly attached to said casing 88. These cutters 92 and 94 cut into small pieces any ice or hard snow received by said disposal device 70, the upper part of which is open to receive said ice or hard snow.

Below said disposal device 70 is a receptacle 96 from which water and articles pass from said device 70. A strainer conduit 98 communicates with the latter and a conduit 100 which latter connects with a discharge pump 102 that discharges water from said tank 28 and disposal device 70. Said pump 102 has a discharge pipe 104.

Water resulting from melting of snow drips from said screen 80 into said tank 28. When it reaches a water level line 106 the water flows through a strainer 108 into a feed conduit 110 that communicates with a coil 112 having several reverse lengths of pipe. Said coil 112 is enclosed by a casing 114. From said coil 112 water passes to a connector conduit 116 to a coil 118 having a casing 120. From said coil 118 the water then flows to a connector 121 to another coil 122 having a casing 124. From said coil 122 the water passes to a connector 126 to another coil 128 having a casing 130. An outlet conduit 132 communicates with said coil 128 and with an electric pump 134 controlled by a switch 135 from which water is pumped to another supply conduit 136 communicating with a distributor conduit 138 having discharge ports 140 through which hot water is forced to thereby spray snow on said screen 80, thus melting the snow. Water therefrom falls towards the bottom of said tank.

A branch distributor conduit 142 continues from conduit 138 and has discharge ports 144 through which hot water is forced diagonally downward to spray snow on the screen 80 and thus aid in melting it.

At the bottom of said discharge conduit 142 is a horizontal branch conduit 146 having discharge ports 148. Three horizontal branch conduits, 150, 152 and 154 extend from said conduit 138 and a horizontal branch conduit 156 extends from said conduit 142. Said horizontal conduits extend across said tank 28, each spraying hot water on the snow accumulated on said screen 80.

When water reaches the water level line 106, a float 158 is actuated that is connected by an arm 160 extending to an electric switch 162 that is attached to said tank 28 and controls operation of said discharge pump 102. This takes care of any excess water which will flow into said disposal device 70 and thence into said pump 102.

A ball cock 166 is connected by an arm 168 to an electric switch 170 that is attached to said tank 28. This switch 170 controls the flow of water through said circulating pump 134, shutting the pump off in case the water drops appreciably below said water level 106 for instance.

To heat the water passing through said coils 112, 118, 122 and 128 a torch burner 184 extends to said coil 112 throwing a flame between and around different pipe lengths forming it. For said coil 118 the burner is 186; for said coil 122 the burner is 188; and for said coil 128 the burner is 190.

The fuel for said four burners is stored in a receptacle 192 attached to said tank 28. Said fuel flows through a strainer 194 from said tank into a conduit 196 having a well-known regulating valve 198 connected thereto. A distributor conduit 200 exends from said conduit 196 and delivers fuel to said torch burners 190, 188, 186 and 184. Said casings 114, 120, 124 and 130 are open at both ends, being fitted in circular cut-outs in opposite sides of said tank 28 and welded to the latter.

Attached to said snow feeding mechanism 55 are five sled runners, 204, 206, 208, 210 and 212 on which my apparatus slides as it gathers snow along a traveled way.

Should water in said tank accumulate to a point that reaches an overflow pipe 216 attached to the tank it will run off into the ground.

In operation, said tank 28 is filled with water or other liquid, somewhat above the water line 106, said valve 198 is opened, said torches are ignited, and my apparatus remains stationary until the water in the coils is hot. Then said circulating pump 134 is turned on, the motor 34 is turned on which results in rotation of said shaft 44 and other parts as previously explained.

My apparatus is then pushed forward by a vehicle at the rear and said rotary snow feeder 52 gathers snow from the ground, throwing it onto said screen 80 to be melted. Since said snow feeding mechanism is quite well enclosed the snow will be mostly deflected onto said screen. Any material, such as heavy particles and any snow that does not reach said screen 80 falls on said wide conveyor belt 74 from which it is delivered to said disposal screw device outer receptacle 88. Said conveyor screw 90 delivers said material to said cutters 92 and 94 where any solid material is ground so all said material will pass into said receptacle 96 and pass through said strainer 98 into said conduit 100 and be discharged through said pump 102 and pipe 104 onto the ground.

Water passes from said tank 28 as explained to said conduit 110 through said coils, where it is heated as explained, finally reaching the said various distributor conduits that discharge hot water onto the screen 80, melting the snow.

Some of said parts 148 in said branch conduit 146 spray hot water on said conveyor belt 74 thus cleaning it.

Also hot water from some parts 148 melt any large pieces of snow or ice that originally may be too large to pass into said disposal receptacle 88.

What I claim is:

1. Snow melting apparatus comprising a chassis, means to gather and melt snow supported by said chassis embodying a tank, snow feeding mechanism including an upwardly inclined conveyor belt having its upper end arranged to deliver snow into the tank adjacent the front wall thereof, an upwardly inclined stationary screen in said tank arranged substantially coextensive with said inclined conveyer belt, a rotary member disposed in front of said conveyer belt arranged to gather the snow and throw a major portion thereof upwardly above said conveyer onto said screen, any snow not reaching the screen falling on said conveyer to be carried into said tank, means disposed above said stationary inclined screen to distribute a medium to melt the snow thrown onto said screen, and a disposal device in said tank adjacent said front wall arranged to receive the snow delivered by said belt and to also receive any unmelted snow from said inclined screen.

2. The combination as defined in claim 1 wherein the distributing means includes a perforated pipe extending horizontally along the upper end of said tank and then vertically along the front wall and terminating at a point intermediate the belt and the screen and above said disposal device.

References Cited in the file of this patent

UNITED STATES PATENTS

| | | |
|---|---|---|
| 1,462,527 | Tully | July 24, 1923 |
| 1,821,292 | Chase | Sept. 1, 1931 |
| 1,841,245 | Hagen | Jan. 12, 1932 |
| 2,104,363 | Devlin | Jan. 4, 1938 |
| 2,221,386 | Smith | Nov. 12, 1940 |
| 2,576,829 | Fiduccia | Nov. 27, 1951 |
| 2,696,814 | Townsend | Dec. 14, 1954 |
| 2,729,000 | Bros et al. | Jan. 3, 1956 |